United States Patent
Ayukawa et al.

(10) Patent No.: US 6,497,632 B2
(45) Date of Patent: Dec. 24, 2002

(54) AUTOTENSIONER

(75) Inventors: Kazumasa Ayukawa, Nara (JP); Hiromi Matsuura, Nara (JP)

(73) Assignee: Unitta Company, Osaka (JP)

( * ) Notice: Subject to any disclaimer, the term of this patent is extended or adjusted under 35 U.S.C. 154(b) by 1 day.

(21) Appl. No.: 09/725,073

(22) Filed: Nov. 29, 2000

(65) Prior Publication Data

US 2002/0010044 A1 Jan. 24, 2002

(30) Foreign Application Priority Data

Jul. 19, 2000 (JP) .......................... 2000-218316

(51) Int. Cl.[7] ................................ F16H 7/08
(52) U.S. Cl. ...................................... 474/135
(58) Field of Search .......................... 474/109, 135, 474/133, 138, 111, 112, 114, 115, 101

(56) References Cited

U.S. PATENT DOCUMENTS

| | | | |
|---|---|---|---|
| 4,557,707 A | 12/1985 | Thomey | 474/101 |
| 4,696,663 A | 9/1987 | Thomey et al. | 474/133 |
| 4,813,915 A * | 3/1989 | Kotzab | 474/133 |
| 4,983,145 A * | 1/1991 | Hirai et al. | 474/117 |
| 5,011,460 A * | 4/1991 | Ouchi et al. | 474/133 |
| 5,334,109 A * | 8/1994 | Izutsu et al. | |
| 5,803,849 A * | 9/1998 | Ayukawa | 474/94 |
| 6,231,465 B1 * | 5/2001 | Quintus | 474/133 |

FOREIGN PATENT DOCUMENTS

| | | |
|---|---|---|
| EP | 780597 | 6/1997 |
| JP | 5-59023 | 8/1993 |
| JP | 5-67854 | 9/1993 |
| JP | 5-83516 | 11/1993 |
| JP | 6-14601 | 2/1994 |

* cited by examiner

Primary Examiner—David A. Bucci
Assistant Examiner—Vicky A. Johnson
(74) Attorney, Agent, or Firm—Greenblum & Bernstein, P.L.C.

(57) ABSTRACT

An autotensioner having a support shaft affixed to a base, and a cup of a swing member provided swingably about the support shaft. The cup opens to the base and houses inside it a torsion coil spring for biasing the pulley in the direction tensioning the belt. A damping member braking the swing member is fixed to the base. A ring-shaped spring brings it into close contact with the inner circumferential surface close to the opening of the cup. The damping member frictionally slides with the inner circumferential surface at the time of swing of the swing member and supports the swing member in the radial direction at the base side from the bearing supporting the support shaft.

9 Claims, 6 Drawing Sheets

AUTOTENSIONER

BACKGROUND OF THE INVENTION

1. Field of the Invention

The present invention relates to an autotensioner for imparting a suitable tension to a belt and attenuating the vibration generated at the belt.

2. Description of the Related Art

An autotensioner is provided with a pulley attached to the end of a swing member swingably supported by a support shaft, so that a suitable tension imparted to a belt, which is in contact with a pulley, due to a change of the relative position of the pulley in association with swing of the swing member. The rotating shaft of the pulley is parallel to and away from the support shaft by a predetermined distance. While the distance between the two shafts is reduced because of the demand for reduction of the size of the autotensioner, the pulley or belt has to be provided at a position different in the axial direction from the swing member so that it can rotate without interfering with the swing member.

Since the pulley is pushed in one direction when the belt is tensioned, a moment load making the swing member tilt about the support shaft acts on the swing member. The further the position in the axial direction away from the swing member, the larger the moment load, so a problem arises where the swing member is easily tilted.

SUMMARY OF THE INVENTION

Therefore, an object of the present invention is to provide an autotensioner in which tilt of the swing member is reduced and the assembly is made as small as possible.

According to the present invention, there is provided an autotensioner comprising a base, a support shaft fixed to the base, a swing member, a pulley and a damping member.

The swing member has a cup having a bottom and opening toward the base, a bearing extending from the bottom toward the base and supported by the support shaft, and an arm extending from an outer circumferential surface of the cup. The swing member can swing about a rotational axis of the support shaft. The pulley is attached to an end of the arm. The damping member is fixed to the base and provided at a position close to the base in comparison with the bearing. The damping member frictionally slides over the approximately entire circumference with respect to an inner circumferential surface of the cup, and supports the swing member.

The autotensioner may further comprise a ring-shaped spring. In this case, the damping member is provided with a tubular portion having the rotational axis as the axial center and is biased by the ring-shaped spring provided inside the tubular portion by a substantially uniform force in the circumferential direction toward the inner circumferential surface of the cup.

Preferably, the autotensioner further comprises a torsion coil spring wound spirally around the support shaft. The torsion coil has two ends engaged with a bottom of the cup and the base. The base side of the torsion coil spring is formed into a pigtail end shape so as to avoid interference with the damping member and the ring-shaped spring. Due to this, it is possible to make efficient use of the space in the cup and reduce the size of the autotensioner.

The inner circumferential surface of the cup may be provided with a step such that the inner diameter of a part of the bottom side of the inner circumferential surface becomes smaller than the inner diameter of the other part of the inner circumferential surface. The damping member is provided inside the other part, so that the damping member is positioned in the axial direction. Preferably, a part of the damping member is inserted to the other part of the inner circumferential surface.

The damping member may have an outer circumferential surface provided with a flange, which is provided between the opening of the cup and the base and is in close contact with the cup and the base. Due to this, interference between the cup and the base and entry of dust and water, etc. into the cup is prevented. In this construction, the outer diameter of the flange may coincide with the outer diameter of the cup. Further, the base may be provided with a first circular groove, which is provided with a second circular groove formed concentrically inside the first circular groove. The outer circumferential surface of the damping member is in close contact with a side surface of the second circular groove, an end surface of the base side of the damping member is in close contact with the bottom of the second circular groove.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention will be described below with reference to the embodiments shown in the drawings.

Figure 1:
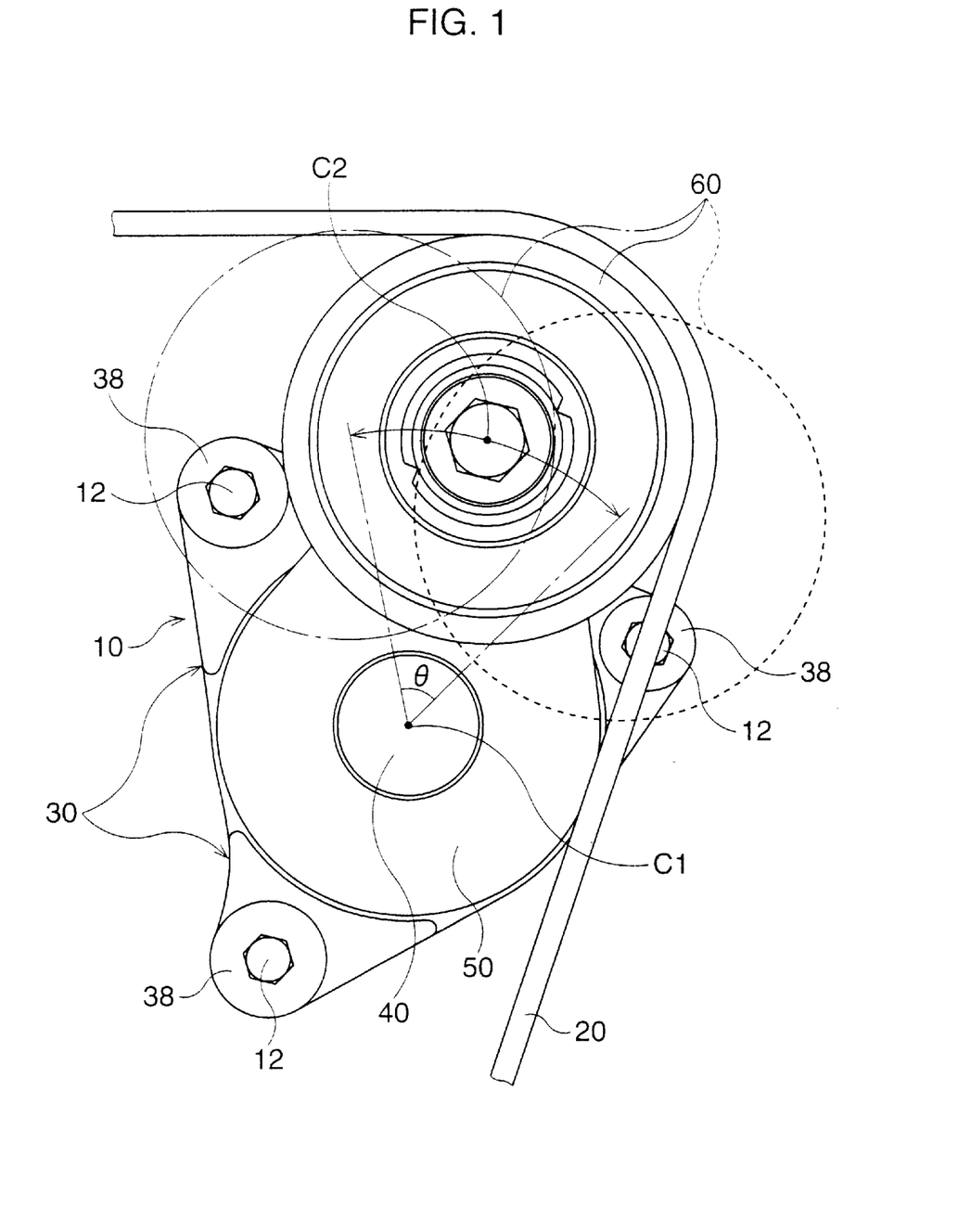
FIG. 1 is a plan view showing an embodiment of the autotensioner according to the present invention, together with a belt.

FIG. 1 shows an autotensioner 10 along with an endless belt 20. The belt 20 is stretched on a drive pulley attached to an output shaft of a not shown engine or a driven pulley attached to shafts of various auxiliary equipment such as an air-conditioner or alternator, so that the rotational driving force of the drive pulley is transmitted to the driven pulley.

The autotensioner 10 is provided with a base 30 fixed to a predetermined position of a not shown engine block by three bolts 12. The support shaft 40 is integrally fixed to the base 30. The swing member 50 can swing within a predetermined angular range about the rotational axis C1 of the support shaft 40. A pulley 60 is rotatably attached to the end of the swing member 50. The rotational axis C2 of the pulley 60 is parallel to the rotational axis C1. The three mounting portions 38 through which the bolts 12 are attached are arranged at substantially equal intervals about the rotational axis C1, while the base 30 is affixed by a substantially uniform force in the circumferential direction.

The pulley 60 is rotated about the rotational axis C2 by the rotational drive of the belt 20 to change in-relative position between the first position shown by the broken line and the second position shown by the dot-chain line in association with the swing action of the swing member 50 about the rotational axis C1, so that the belt 20, which is in contact with the outer circumferential surface of the pulley 60, is tensioned or loosened. The swing member 50 is biased by a predetermined force in the clockwise direction of the drawing about the rotational axis C1. The belt 20 is thereby given a suitable tension.

Figure 2:
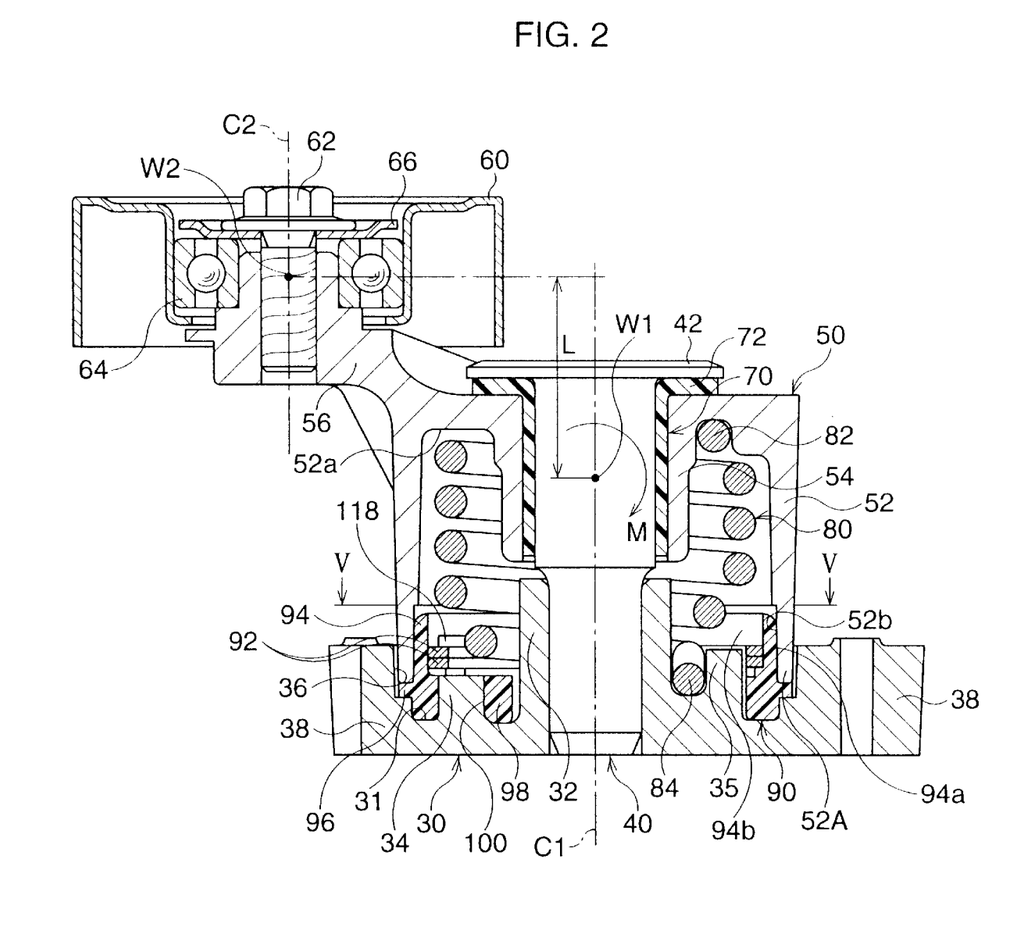
FIG. 2 is a sectional view of the autotensioner shown in FIG. 1.

FIG. 2 is a sectional view of the autotensioner 10. The swing member 50 is provided with a cup 52 opening toward the base 30. An edge of the opening of the cup 52 is housed in a circular groove 36 formed in the base 30. The swing member 50 is provided with a bearing 54 supported in the radial direction by the support shaft 40. The bearing 54 has a tubular shape extending from the center of the cup bottom 52a toward the base 30. The axial center of the bearing 54 is coincident with the rotational axis C1. The axial length of the bearing 54 is approximately half of the axial length of the cup 52. The swing member 50 or base 30 is complicated in shape, so is formed from an easily workable soft metal such as aluminum. Note that in the following explanation, the axial direction indicates a direction parallel to the rotational axis C1.

The bearing 54 has press-fit into it a tubular slide bearing 70 formed from a plastic material, superior in wear resistance and with a relatively small frictional coefficient, and the upper half of the support shaft 40 is fit in the slide bearing 70. The lower half of the support shaft 40 is smaller in diameter than the upper half, and is affixed by being press-fit in the tubular fixing portion 32 of the base 30. The head 42 of the support shaft 40, projecting from the cup 52, is formed in a disk shape having a diameter about twice the diameter of the support shaft 40. The relative position of the cup 52 in the axial direction is restricted by the head 42. Thus, the swing member 50 is affixed swingably about the rotational axis C1, and the slide bearing 70 and support shaft 40 frictionally slide when the swing member 50 swings. The slide bearing 70 is formed with a flange 72. This flange 72 is provided between the flange of the head 42 and the cup 52, and prevents cracking or damage due to interference between the head 42 and the cup 52.

The swing member 50 is provided with an arm 56 integral with the cup 52. The arm 56 extends from part of the outer circumferential surface of the bottom of the cup 52 to the outside in the radial direction. A pulley 60 is attached at the end of the arm 56 through a ball bearing 64. Due to this, the pulley 60 can rotate about the rotational axis C2 with respect to the arm 56. The ball bearing 64 is affixed in the axial direction by a bolt 62 and the washer 66, and is prevented from pulling out above in the drawing.

A torsion coil spring 80, which is wrapped in a spiral around the support shaft 40, is housed in the cup 52 in a suitably twisted state. One end 82 of the torsion coil spring 80 is engaged with the cup bottom 52a, while the other end 84 is engaged with the base 30. Due to the spring force of the torsion coil spring 80, the cup 52 and the swing member 50 are constantly biased to swing in a rotational direction with respect to the base 30 (clockwise direction of FIG. 1). Due to this, the belt 20 is suitably tensioned and prevented from slacking and the driving force of the engine is reliably transmitted to various auxiliary equipments.

The autotensioner 10 has a damping mechanism, which attenuates the vibration generated in the belt 20, caused by changes of the rotational speed of the engine, etc. The damping mechanism is provided with a plastic damping member 90, affixed to the base 30 to frictionally slide with the swing member 50, and a ring-shaped spring 92, which biases the damping member 90 towards the swing member 50 with a constant pushing force. The damping mechanism imparts frictional resistance to the swing of the swing member 50. Due to this, the swing member 50 or the pulley 60 is braked, and the vibration of the belt 20 is attenuated.

Figure 3:
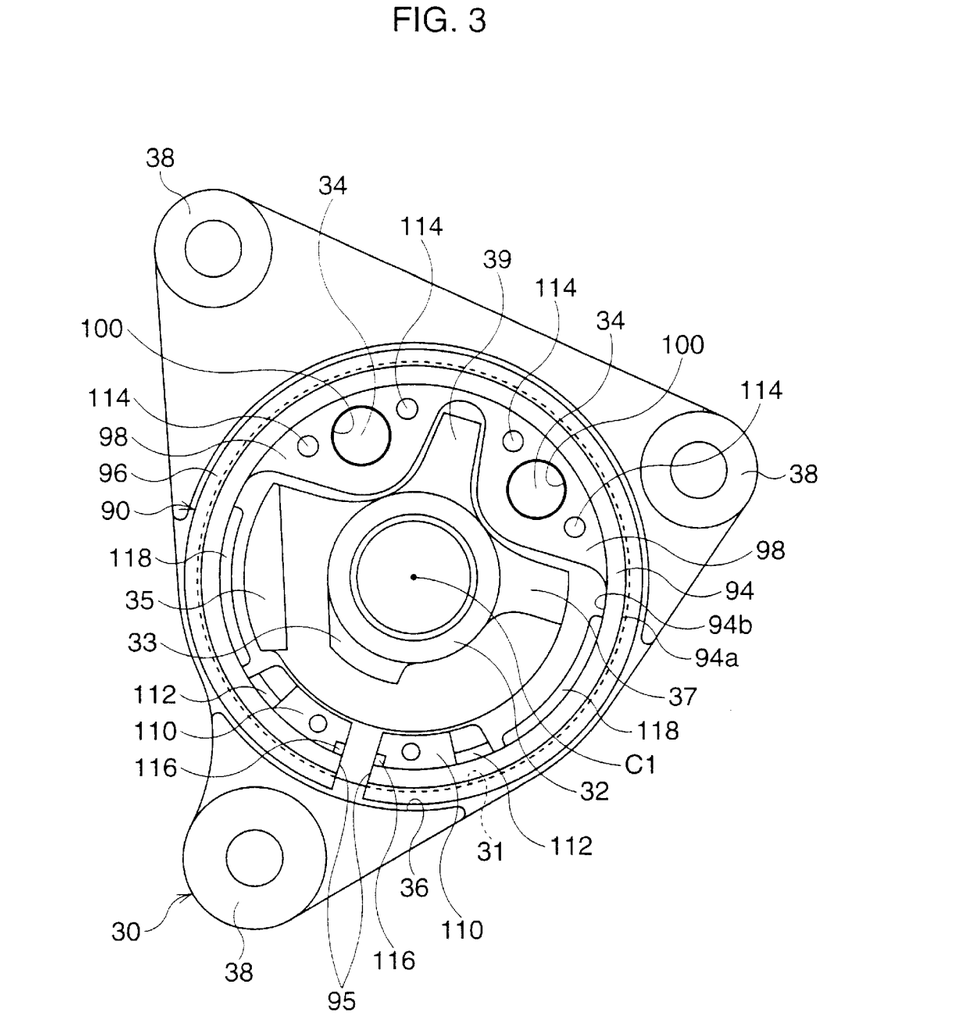
FIG. 3 is a plan view in which the damping member is attached is to the base.
Figure 4:
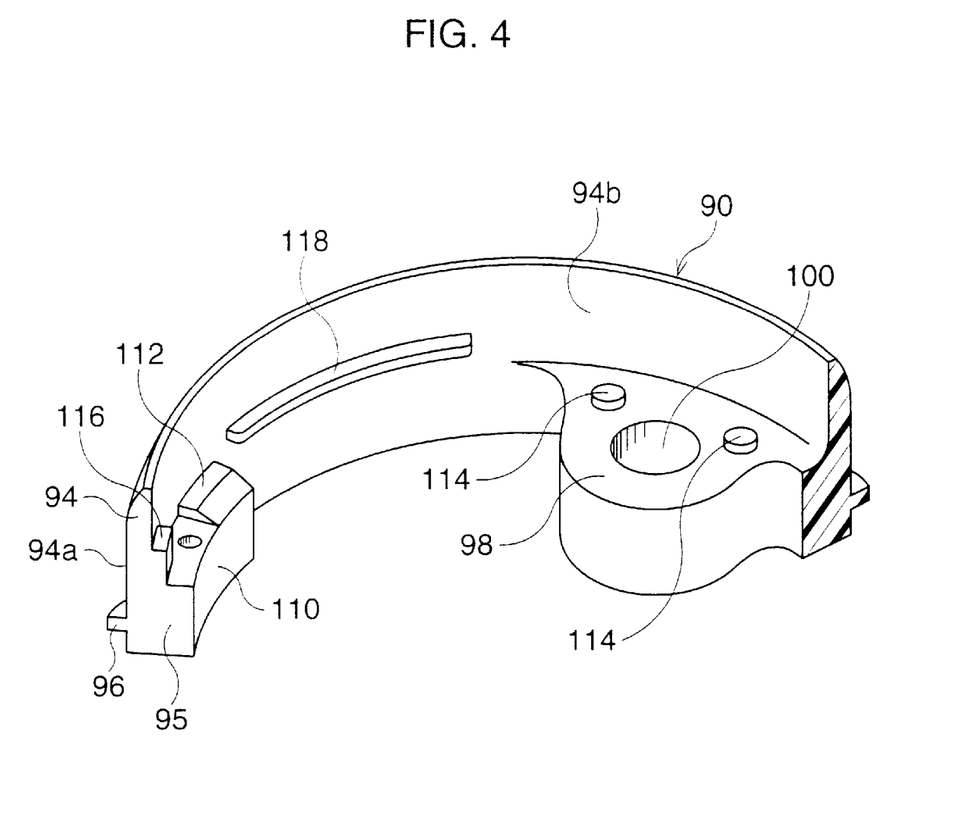
FIG. 4 is a perspective view of a part of the damping member.

With reference to FIGS. 2, 3 and 4, the damping member 90 will be explained in detail. FIG. 3 shows part of the damping member 90 and FIG. 4 shows the damping member 90 attached to the base 30.

The damping member 90 is provided with a tubular portion 94 with the rotational axis C1 as its axial center. The diameter of the outer circumferential surface 94a of the tubular portion 94 is substantially equal to the diameter of the inner circumferential surface 52b close to the opening of the cup 52. Approximately ⅔ of the tubular portion 94 in the axial direction is inserted into approximately ¼ of the length in the axial direction from the opening of the cup 52. The outer circumferential surface 94a and the inner circumferential surface 52b are in close contact over the outer circumference. The outer circumferential surface 94a has a flange 96, which is provided between the opening of the cup 52 and the base 30 and is in close contact with the cup 52 and the base 30 to prevent interference between them and prevent entry of dust, water, etc. into the cup 52.

The outer diameter of the flange 96 coincides with the outer diameter of the cup 52. The diameter of the circular groove 36, in which the cup 52 and the flange 96 are disposed, is slightly larger than each of the outer diameters. A much lower circular groove 31 is formed concentrically at the inside of the circular groove 36. The outer circumferential surface 94a of the tubular member is in close contact with the side surface of the circular groove 31, while the end surface of the base 30 side of the tubular portion 94 is in close contact with the bottom of the circular groove 31.

The tubular portion 94 is opened partially in the circumferential direction. Therefore, even if the outer circumferential surface 94a, which frictionally slides with the inner circumferential surface 52b of the cup 52, is worn, the opening 95 broadens and expands in the radial direction by the biasing force of the ring-shaped spring 92 pushing out in the radial direction, and the outer circumferential surface 94a is in constant contact with the inner circumferential surface 52b. Due to this, a uniform and stable frictional resistance is obtained in the circumferential direction and uneven wear is prevented.

Two mounting portions 98 are provided integrally at the inside of the tubular portion 94. These mounting portions 98 are provided extending from the side end surface of the base 30 to the middle of the tubular portion 94. In the circumferential direction of the tubular portion 94, to allow displacement of the opening 95, the mounting portions 98 are provided in proximity with each other at positions furthest away from the opening 95. Holes 100 are formed in the axial direction through the mounting portions 98, and pins 34 of the base 30 are tightly fitted in the holes 100. The pins 34 extend from the bottom of the circular groove 31 toward the cup 52. Due to engagement of the pins 34 and the holes 100, the damping member 90 is positioned in the circumferential direction at the base 30. Note that, by gripping the flange 96 by the opening of the cup 52 and the circular groove 36 of the base 30, or by forming a step at the inner circumference of the cup 52 so that the inner diameter of about ¾ of the bottom side of the cup 52 becomes smaller than the diameter of the inner circumferential surface 52b, the damping member 90 is positioned in the axial direction.

The damping member 90 is formed integrally from a plastic material superior in wear resistance under a high temperature environment. As a suitable plastic, for example, polyamide resin, polyether sulfone resin, polyphenylene sulfide resin, etc. can be used.

The damping member 90 has the function of a slide bearing for supporting in the radial direction the cup opening 52A, and has enough rigidity to sufficiently enable functioning as a slide bearing. When the tensioned belt 20 pushes the side surface of the pulley 60 in one direction, the moment load M (FIG. 2) rotating about the center of the axial load W1 acts on the swing member 50 and the swing member 50 easily tilts, as the positions in the axial direction of the center of the load W1 of the bearing 54 and the center of the load W2 of the pulley 60 are separated by the length L. To reduce the lever of the moment load M, that is, the length L in the axial direction between the two centers of weight W1 and W2, the bearing 54 is biased toward the pulley 60 (i.e., toward the cup bottom 52a). Therefore, when the swing member 50 is inclined, the displacement of the cup opening 52A furthest from the center of load W1 of the bearing increases. In the embodiment, the cup opening 52A is supported in the radial direction by the damping member 90. Due to this, it is possible to effectively suppress displacement of the cup opening 52A, that is, the tilt of the swing member 50.

Further, the damping member 90 serving as the slide bearing has a larger diameter than the slide bearing 70 of the bearing 54 and therefore a broader support area, so the load burden on the slide bearing 70 can be reduced and early wear or early breakage can be prevented.

Further, the damping member 90 is buried about ⅔ of its axial length in the circular grooves 36 and 31 of the base 30. The pins 34 are positioned at the approximate centers of the mounting portions 38 in the axial direction where the bolts 12 are inserted (see FIG. 2). Due to this, the damping member 90 is strongly affixed to the base 30, and the displacement of the relative position is extremely small resulting in stability. Therefore, the swing member 50 supported by the damping member 90 is resistant to tilt. Note that part of the cup opening 52A is housed in the circular groove 36 and the end surface of the cup opening 52A is positioned on the plane which substantially coincides with the center of the axial direction of the mounting portion 38. Therefore, excessive displacement of the cup opening 52A is prevented by support by the side surface of the facing circular groove 36, that is, the mounting portion 38.

Thus, in the embodiment, the damping mechanism is positioned at the cup opening 52A and nothing is between the torsion coil spring 80 and the inner circumference of the bottom of the cup 52. Accordingly, it is possible to set the diameter of the upper half of the bearing 54 or support shaft 40 larger than in a conventional device while keeping the cup 52 small in size. Therefore, it is possible to broaden the bearing area of the bearing 54, improve the strength of the support shaft 40 and to further suppress the tilt of the swing member 50.

In this way, the damping member 90 not only imparts a uniform and stable frictional resistance to the swing member 50, but also plays the role of a radial bearing to prevent tilt of the swing member 50.

Figure 5:
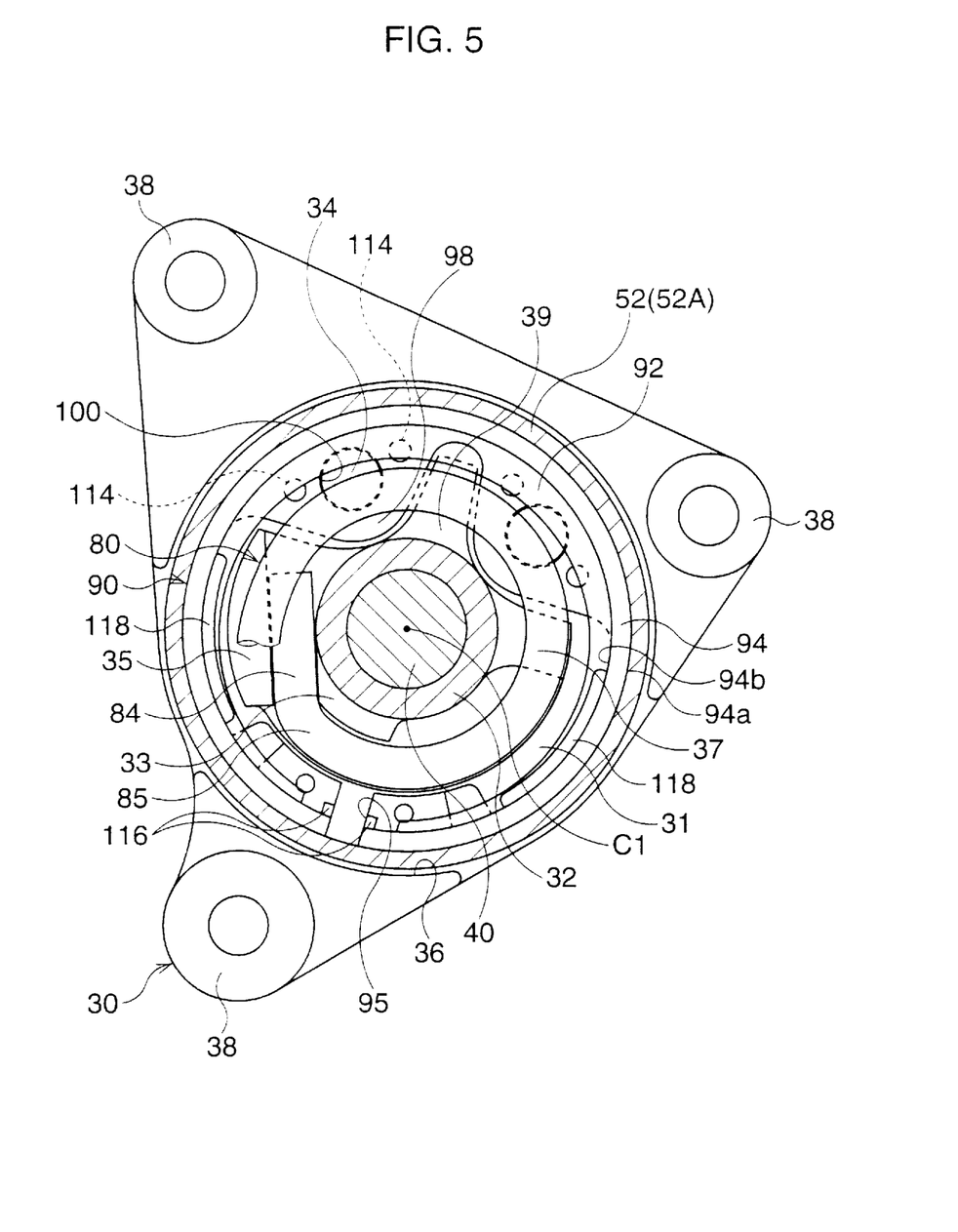
FIG. 5 is a sectional view of the autotensioner shown in FIG. 2 along the line V—V.
Figure 6:
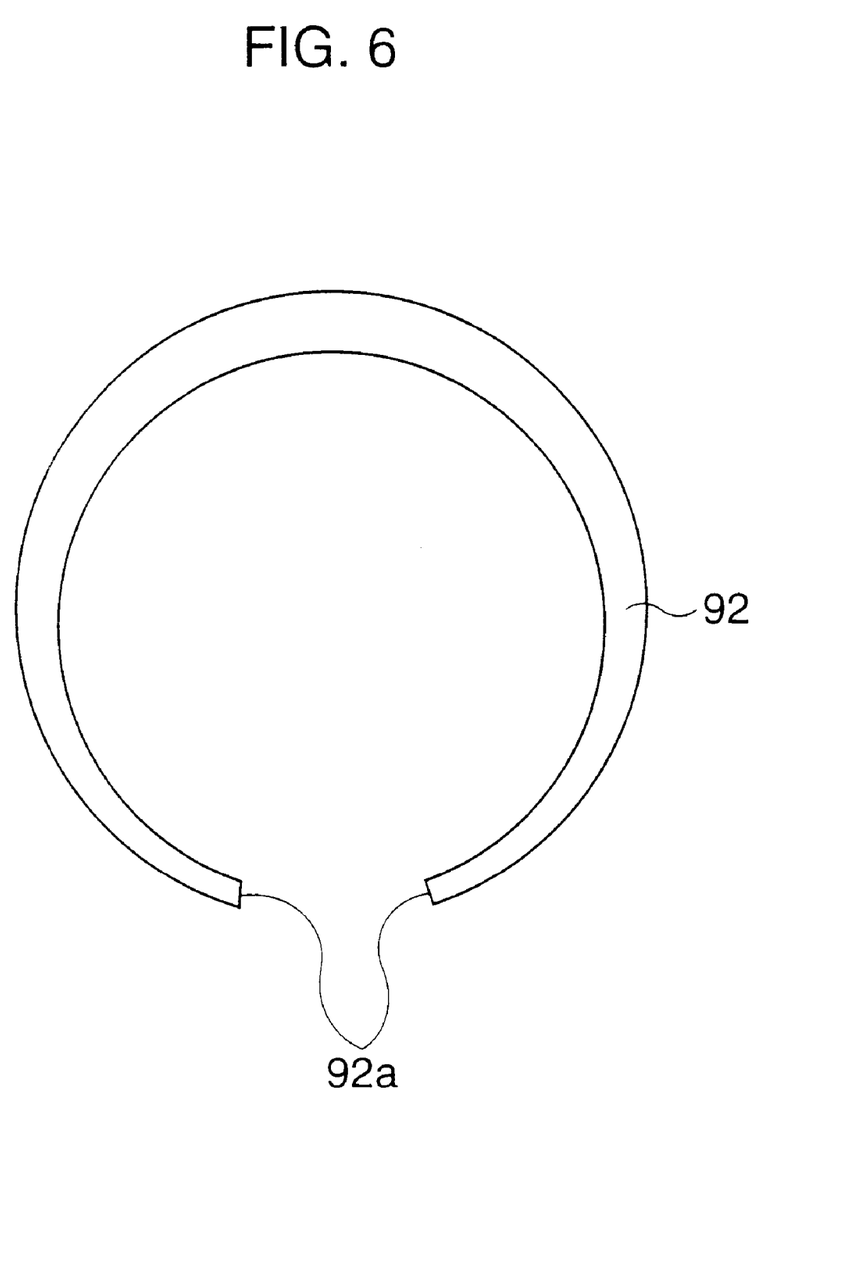
FIG. 6 is a plan view of a ring-shaped spring.

With reference to FIGS. 3, 4, 5 and 6, an explanation will be given of the configuration of the ring-shaped spring 92 and the mounting to the damping member 90. FIG. 5 is a sectional view along the line V—V of FIG. 2, and shows mounting of the ring-shaped spring 92 and the torsion coil spring 80 in addition to the damping member 90. FIG. 6 shows the ring-shaped spring 92.

The ring-shaped spring 92 is a C-spring with a thickness in the radial direction gradually increasing from the open ends 92a. It is folded into two in the axial direction and attached at a center portion of the inner circumferential surface 94b of the tubular member of the damping member 90 in the axial direction. The ring-shaped spring 92 is mounted in a state, smaller in the radial direction than when in the unmounted state. Due to this, the damping member 90 is biased in the circumferential direction by a substantially uniform force in the radial direction, toward the inner circumferential surface 52b of the opening, whereby a constant frictional resistance is given to the swing member 50. Note that the material, spring force, and number of the ring-shaped springs 92 may be changed to suit the frictional resistance required.

A plurality of projections are formed on the inner circumferential surface 94b of the tubular member of the damping member 90 to position the ring-shaped spring 92 in the axial direction. Specifically, the two open ends of the tubular portion 94 are provided with seats 110 at the same axial length as the mounting portions 98 from the lower ends of the base 30. The ends of the seats 110 at the pulley 60 side are provided with block-shaped projections 112 so that the ring-shaped spring 92 is supported from the base 30 side. Note that the ends of the mounting portions 98 at the pulley 60 side are also provided with two cylindrical projections 114 of the same height as the block-shaped projections 112. Anti-rotation projections 116 is formed on the open end edges of the seats 110 to hold the open ends of the ring-shaped spring 92. Band-shaped projections. 118 for supporting the ring-shaped spring 92 from the pulley 60 side are provided between the mounting portions 98 and the seats 110. Due to this configuration, the ring-shaped spring 92 is positioned in the radial and axial directions with respect to the damping member 90.

As shown in FIGS. 2 and 5, the base 30 side of the torsion coil spring 80 is formed in a pigtail end shape. Namely, the diameter of the final turn of the torsion coil spring 80 is gradually reduced, so that interference between the damping member 90 and the ring-shaped spring 92 is avoided. The other end 84 of the torsion coil spring 80 is bent to the inside in the radial direction, and extends straight from the bent portion 85 to it send. A first engagement projection 33 is integrally formed on the outer circumferential surface of the tubular fixing member 32 of the base 30 to support the other end 84 from the side, while a second engagement projection 35 is formed close to the first engagement projection 33 to sandwich the other end 84 with the engagement projection 33. Thus, since one end of the torsion coil spring 80 is formed in a pigtail end shape and the inside space of the damping member 90 and ring-shaped spring 92 is effectively utilized, the cup 52 can be reduced in size.

The torsion coil spring 80 extends from the other end 84 in a counterclockwise direction. The first turn of the torsion coil spring 80 passes above the two mounting portions 98. The 10 torsion coil spring 80 is supported from the base 30 side by two support projections 37 and 39 (see FIG. 5), which are provided between the mounting portions 98. The support projections 39 sandwiched between the two mounting portions 98 are higher than the mounting portions 98, so that interference between the torsion coil spring 80 and the mounting portions 98 is avoided. The support projection 37 provided before the mounting portion 98 at the right side in the drawing is set to a height substantially equal to or slightly lower than, the mounting portion 98.

In a belt system using a conventional autotensioner in which the damping member and ring-shaped spring are arranged at the pulley side, the endurance time until reaching the allowable 0.5 degree of angle of tilt of the swing member 50 was about 250 hours. Conversely, in the autotensioner 10 of the embodiment in which the damping member 90 and the ring-shaped spring 92 are arranged at the base 30 side, the endurance time was extended to about 500 hours and the durability was improved two-fold from the past.

Thus, in the autotensioner 10 of the embodiment, not only does the damping member 90 brake the swing member 50, but there is also the function of a bearing supporting the swing member 50 in the radial direction. Therefore, tilt of the swing member 50 is prevented. Further, since the damping member 90 is inserted ⅔ in the circular grooves 31 and 36 of the base 30, the damping member 90 is firmly supported by the base 30.

Although the embodiments of the present invention have been described herein with reference to the accompanying drawings, obviously many modifications and changes may be made by those skilled in this art without departing the scope of the invention.

The present disclosure relates to subject matter contained in japanese patent application No. 2000-218316 (filed on Jul. 19, 2000) which are expressly incorporated herein, by reference, in its entirety.

What is claimed is:

1. An autotensioner comprising:
   a base;
   a support shaft fixed to said base;
   a swing member that has a cup having a bottom and opening toward said base, a bearing extending from said bottom toward said base and supported by said support shaft, and an arm extending from an outer circumferential surface of said cup, said swing member being able to swing about a rotational axis of said support shaft;
   a pulley attached to an end of said arm;
   a damping member that is fixed to said base and provided at a position close to said base in comparison with said bearing, said damping member frictionally sliding over the approximately entire circumference with respect to an inner circumferential surface of said cup, and supporting said swing member;
   a ring-shaped spring, said damping member being provided with a tubular portion having the rotational axis as the axial center and being biased by said ring-shaped spring provided at an inside of said tubular portion by a substantially uniform force in the circumferential direction toward the inner circumferential surface of said cup; and
   a torsion coil spring wound spirally around said support shaft, said torsion coil having two ends held engaged with a bottom of said cup and said base, the base side of said torsion coil spring being formed into a pigtail end shape so as to avoid interference with said damping member and said ring-shaped spring.

2. An autotensioner according to claim 1, wherein said inner circumferential surface of said cup is provided with a step difference such that the inner diameter of a part of the bottom side of said inner circumferential surface becomes smaller than the inner diameter of a further part of said inner circumferential surface, said damping member being provided inside the further part.

3. An autotensioner according to claim 2, wherein a part of said damping member is inserted into the further part of said inner circumferential surface.

4. An autotensioner according to claim 1, wherein said damping member has an outer circumferential surface provided with a flange, which is provided between the opening of said cup and said base and is in close contact to said cup and said base.

5. An autotensioner according to claim 4, wherein the outer diameter of said flange coincide with the outer diameter of said cup.

6. An autotensioner according to claim 5, wherein said base is provided with a first circular groove which is provided with a second circular groove formed concentrically at the inside of said first circular groove, said outer circumferential surface of said damping member being in close contact with a side surface of said second circular groove, an end surface of the base side of said damping member being in close contact with a bottom of said second circular groove.

7. An autotensioner comprising:
   a base;
   a support shaft fixed to said base;
   a swing member that has a cup having a bottom and opening toward said base, a bearing extending from said bottom toward said base and supported by said support shaft, and an arm extending from an outer circumferential surface of said cup, said swing member being able to swing about a rotational axis of said support shaft;
   a pulley attached to an end of said arm; and
   a damping member that is fixed to said base and provided at a position close to said base in comparison with said bearing, said damping member frictionally sliding over the approximately entire circumference with respect to an inner circumferential surface of said cup, and supporting said swing member;
   wherein said inner circumferential surface of said cup is provided with a step difference such that the inner diameter of a part of the bottom side of said inner circumferential surface becomes smaller than the inner diameter of a further part of said inner circumferential surface, said damping member being provided inside the further part.

8. An autotensioner according to claim 7, wherein a part of said damping member is inserted into the further part of said inner circumferential surface.

9. An autotensioner comprising:
   a base;
   a support shaft fixed to said base;
   a swing member that has a cup having a bottom and opening toward said base, a bearing extending from said bottom toward said base and supported by said support shaft, and an arm extending from an outer circumferential surface of said cup, said swing member being able to swing about a rotational axis of said support shaft;
   a pulley attached to an end of said arm; and
   a damping member that is fixed to said base and provided at a position close to said base in comparison with said bearing, said damping member frictionally sliding over the approximately entire circumference with respect to an inner circumferential surface of said cup, and supporting said swing member;
   wherein said damping member has an outer circumferential surface provided with a flange, which is provided between the opening of said cup and said base and is in close contact to said cup and said base, the outer diameter of said flange coinciding with the outer diameter of said cup;

wherein said base is provided with a first circular groove which is provided with a second circular groove formed concentrically at the inside of said first circular groove, said outer circumferential surface of said damping member being in close contact with a side surface of said second circular groove, an end surface of the base side of said damping member being in close contact with a bottom of said second circular groove.

* * * * *